United States Patent [19]
Ciscon

[11] 4,219,994
[45] Sep. 2, 1980

[54] ADJUSTABLE PIVOTING HAND RAKE

[76] Inventor: Julian J. Ciscon, 5758 W. 59th St., Chicago, Ill. 606038

[21] Appl. No.: 18,611

[22] Filed: Mar. 8, 1979

[51] Int. Cl.³ .............................................. A01D 7/00
[52] U.S. Cl. .................................. 56/400.14; 294/53.5
[58] Field of Search .................... 294/53.5, 50.7, 50.8; 56/400.02, 400.03, 400.14, 400.15, 400.19, 400.20

[56] References Cited
U.S. PATENT DOCUMENTS

| 2,033,451 | 3/1936 | Rose | 56/400.14 |
| 2,855,746 | 10/1958 | Miller, Jr. | 56/400.19 |
| 3,495,388 | 2/1970 | Anesi | 56/400.14 |

Primary Examiner—James B. Marbert
Attorney, Agent, or Firm—Merriam, Marshall & Bicknell

[57] ABSTRACT

A pivoting-pull type hand rake with a rake tyne assembly and wheels on each side thereof rollably supporting the rake tyne assembly to the wheel axles. Adjustable means, including apertures along the bracket enable the operator to pre-set and adjust the maximum ground penetration by the tynes.

3 Claims, 4 Drawing Figures

ADJUSTABLE PIVOTING HAND RAKE

This invention relates to lawn and garden rakes, and more particularly to hand operated rakes of the type to be pulled by the user.

BACKGROUND OF THE INVENTION

Reference may be made to the following U.S. patents of interest: U.S. Pat. Nos. 3,070,945; 4,063,407; 2,511,642; 1,939,385; 1,763,473; and 4,009,560.

Rakes are commonly used on lawns to remove grass clippings, thatch build-up, leaves, etc. Occasionally, rakes are also used on gardens for tilling and cultivating the soil. Presently available, manually operated pull-type rakes require one to expend a considerable amount of energy during usage. The weight of the rake normally readily permits the rake tynes to rigorously engage in the grass so that the operator must use a substantial amount of energy in pulling the rake tynes through the grass. The same situation is also found when using a hand rake in gardens in that the tynes engage the soil, and thus must be vigorously pulled through the soil by the operator.

In many situations, it is desired that the rake tynes not penetrate so deeply into the grass or the soil, such as during the removal of grass clippings or in the final preparation of a garden surface prior to planting. Thus, it would be desirable to enable the operator to readily adjust, during usage, the degree of penetration by the tynes below the lawn or garden surface. In addition, it is desirable to enable the operator to pre-set and adjust the maximum ground penetration by the tynes to correspond to a particular hand-raking situation. While some of the aforementioned patents permit an operator to pivot the tynes of a pull-type rake, none show any structure permitting an operator to pre-set and adjust the tynes maximum ground penetration.

SUMMARY OF THE INVENTION

In accordance with the principles of the present invention, there is provided a pivoting-pull hand rake with blade tynes rigidly mounted to a rake shaft and a ground engaging wheel located on either side of the tynes. A pair of elongated brackets includes means interconnecting the rake shaft and the wheels to enable the rake shaft to pivot with respect to the wheels. Means, including a series of apertures on each bracket are included for adjustably positioning the pivot point of the tynes with respect to the ground. The pivoting mount provided between the tynes and the wheels enables the operator to control the degree of penetration depth by the tynes during use by raising or lowering the rake handle, thereby pivoting the tynes in accordance with the adjustable mounting position. Furthermore, by adjusting the mounting position of the bracket on the wheel axle, the height of the tynes with respect to ground and therefore their maximum ground penetration can be correspondingly adjusted.

DETAILED DESCRIPTION

Figure 1:
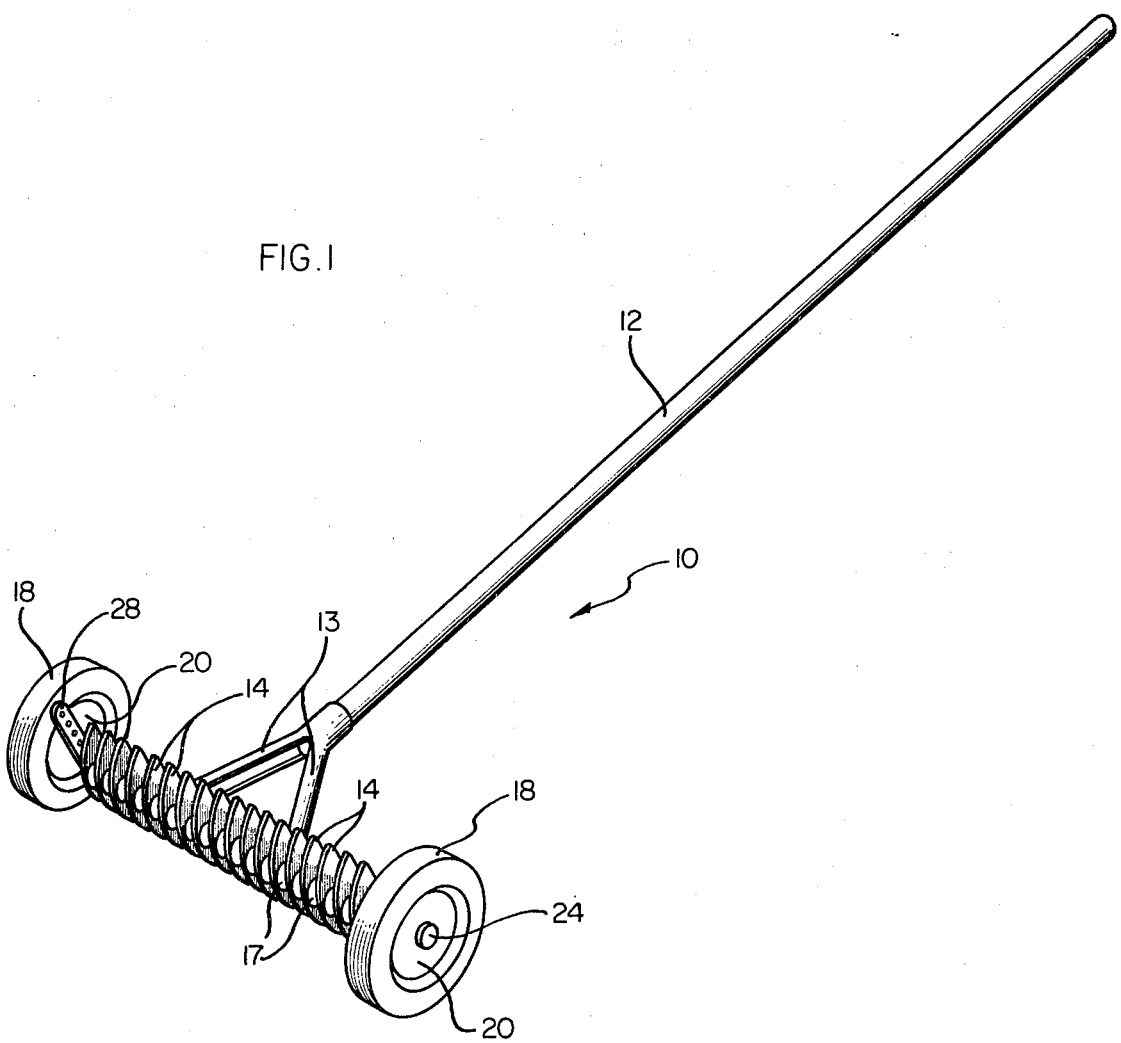
FIG. 1 is a perspective view of a pivoting-pull hand rake constructed in accordance with the principles of the present invention.

With reference to FIGS. 1–4, there is illustrated a preferred embodiment of the invention. In particular, an adjustable, pull-type rake 10 includes a handle 12 rigidly mounted to a yoke 13 which in turn is rigidly mounted to a plurality of rake tynes 14 attached to a rake shaft 16. Spacers 17 maintain the tynes 14 in substantially parallel position on the rake shaft. Each of the rubber wheels 18 located on either side of the rake include a hub 20 through which there may be inserted a wheel axle bolt 22. Each of the axle bolts 22 includes an enlarged cap 24 at one end and a threaded end 26 extending beyond the hub 20 as shown most clearly in FIG. 2. The wheels 18 rollably support the rake as the operator moves the unit during use.

Figure 2:
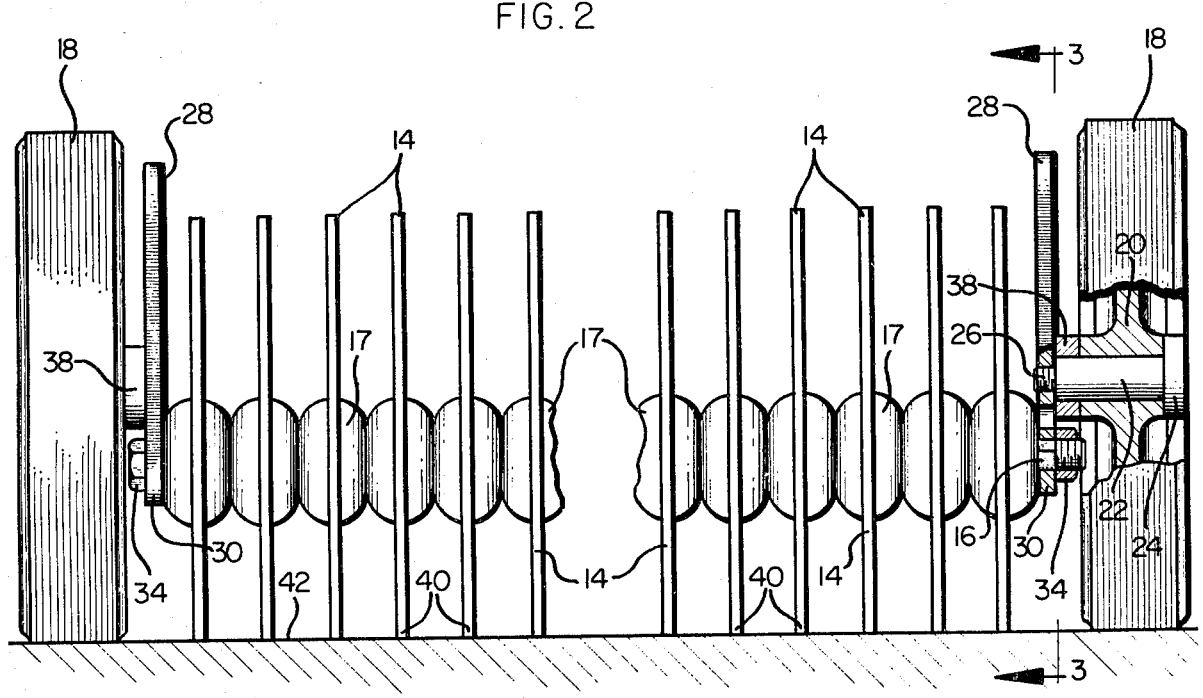
FIG. 2 is a front elevational view of the rake shown in FIG. 1, fragmented and with a portion partially cut away to illustrate the mounting of the tynes rake shaft to each wheel axle by means of a bracket.

Referring to FIG. 2, a height adjusting bracket 28 provided on each side of the rake has one end 30 with an aperture 32 (see FIGS. 3 or 4) suitably dimensioned so as to accommodate the rake tynes shaft 16. A respective lock nut 34 threadably engages each of the threaded ends of the rake tyne shaft so as to rigidly mount height adjusting bracket 28 onto tyne shaft 16.

Figure 3:
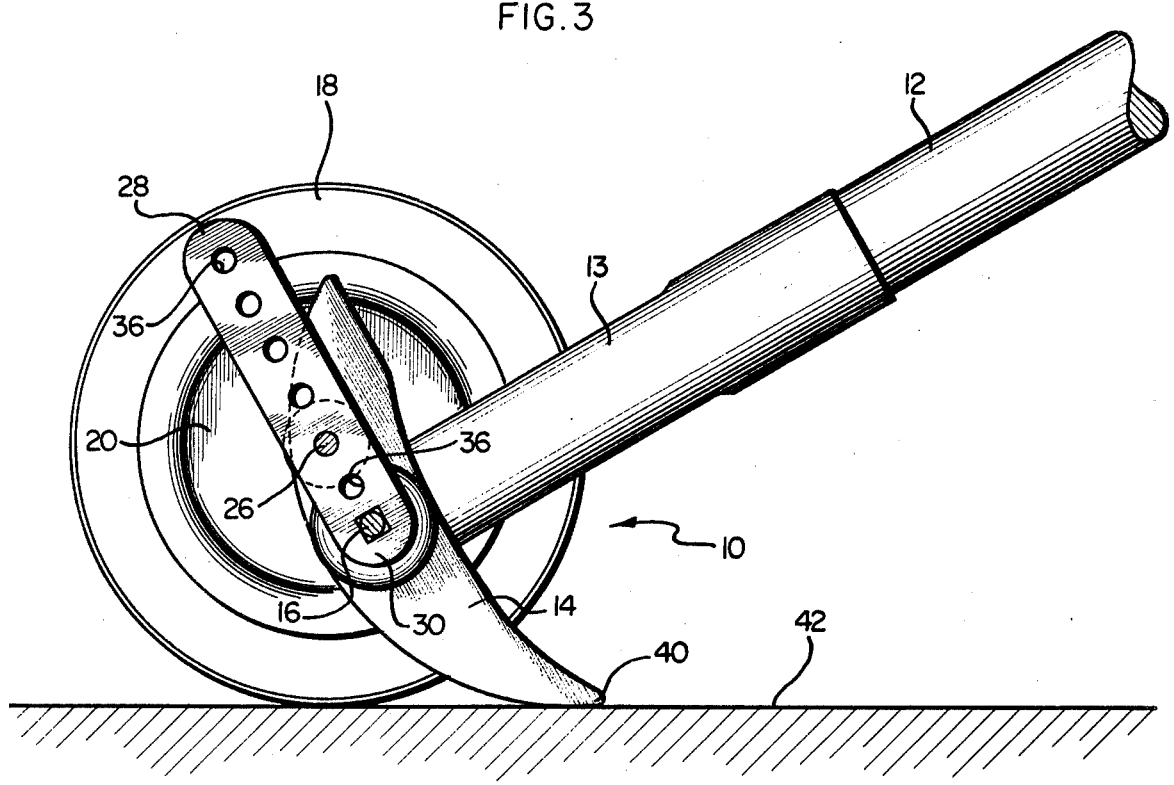
FIG. 3 is a sectional view taken along section line 3—3 of FIG. 2 illustrating the pivotable mounting of one end of the tyne rake shaft to the wheel axle enabling the operator to adjust the degree of ground penetration by the tynes.
Figure 4:
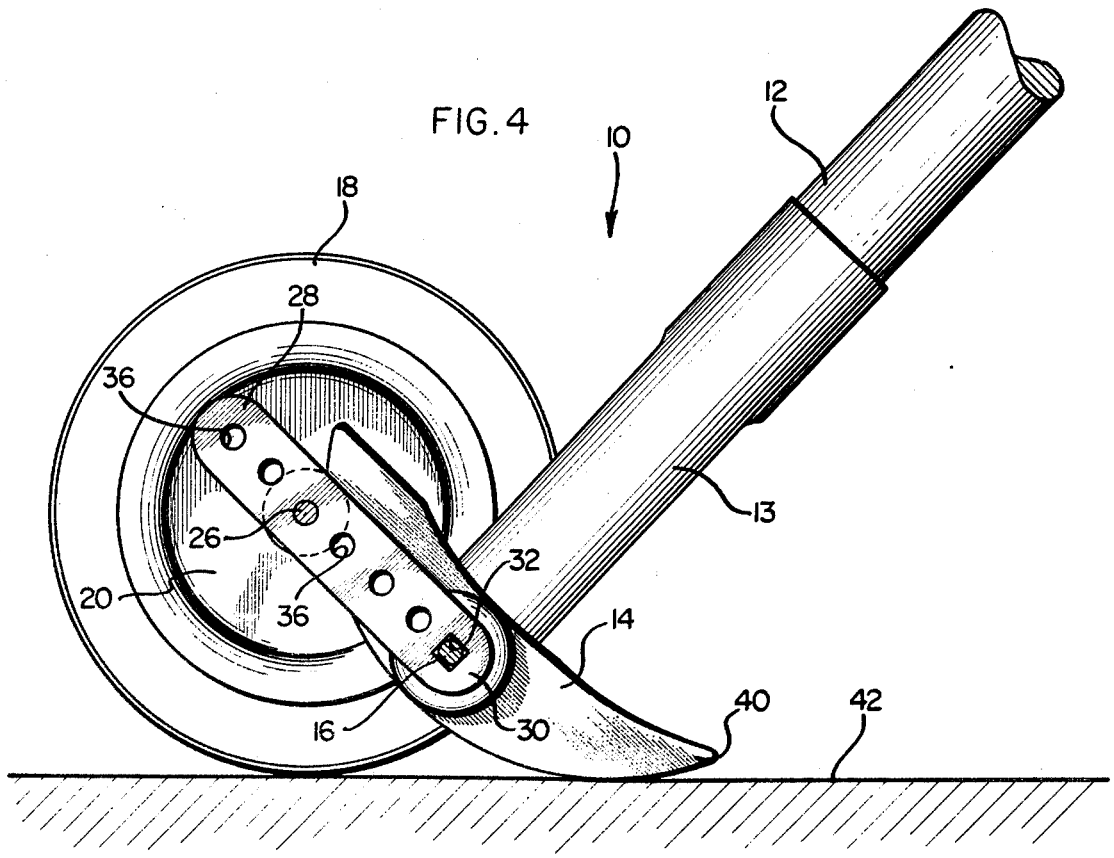
FIG. 4 is a sectional view similar to that of FIG. 3, with the bracket mounted at a different location at the wheel axle thereby adjusting the maximum penetration of the tyne tips with respect to ground.

As can be seen most clearly from FIGS. 3 and 4, a series of threaded apertures are spacially separated along bracket 28. Thus, inserting wheel axle bolt 22 through hub 20 and a spacer member 38 enables threaded bolt end 26 to threadably engage one of the threaded apertures 36 on the height adjusting bracket 28. Thus, raising or lowering handle 12 provides an off-center pivoting of the tyne tips 40 about the wheel axle 22 rather than the rake tynes shaft 16. Such an off-center pivotal mounting provides a cantilever action whereby raising or lowering the rake handle will decrease or increase the degree of penetration by the tyne tips 40 into the ground 42. This enables the operator to readily adjust the degree of ground penetration during operation and thereby greatly reduce the effort usually required in, for instance, hand-raking a lawn.

Furthermore, the series of apertures 36, permits the operator to adjustably set the tynes height or the maximum ground penetration by the rake tyne tips 40 with respect to the ground 42. In particular, note that in FIG. 3, the rake tyne shaft is positionably closer to the wheel axle than in FIG. 4. Thus, with the mounting of the height adjusting bracket 28 as shown in FIG. 4, the tyne tips 40 can penetrate deeper into and below the ground surface 42 than the configuration shown in FIG. 3. The operator can thereby adjustably position the tyne tips to correspond to the particular raking or tilling operation desired.

As an example, if a large area such as a lawn is to be raked of leaves in the fall, it would be a significant advantage to enable one to adjustably raise the tyne tips 40 with respect to the ground level. The operator, for instance, could set the bracket 28 in the position shown in FIG. 3 or in the next position closest to the tyne shaft 16. This permits the operator to remove the leaves from the lawn without the tynes undesirably raking and hooking the top of the grass roots or otherwise engaging the ground. The operator may therefore expend less energy with this tyne height adjusting and pivoting feature as set forth herein when compared to a standard pull-type rake or even a pull-type rake with wheels.

While particular embodiments of the present invention have been shown and described, it will be obvious to those skilled in the art that various changes and modifications may be made without departing from the invention in its broader aspects. Accordingly, the aim of the appended claims is to cover all such changes and modifications as may fall within the true spirit and scope of the invention.

What is claimed is:

1. An adjustable height, pull-type ground rake comprising:
   a rake assembly including a plurality of rake tynes rigidly mounted along a shaft, and a handle for pulling said rake assembly;
   an elongated bracket, at each end of said rake shaft, having a series of apertures extending along the length of said bracket;
   means mounting one end of each of said brackets to a respective end of said rake shaft;
   a pair of ground engaging wheels including a hub having a central axis positionably aligned with a selected one of said bracket apertures corresponding to the desired height of said rake tynes and thus pre-setting the maximum ground penetration of said tynes;
   an axle bolt having one end rigidly mounted to said selected bracket aperture and having another end extending through said hub along said central axis for rotatably supporting said wheels and enabling pivotal movement of said rake tynes; and
   said rake shaft is pivotally moved below said hub central axis during use.

2. An adjustable height, pull-type ground rake according to claim 1, wherein said axle bolt one end threadably engages said selected bracket aperture.

3. An adjustable height, pull-type ground rake according to claim 2, wherein said axle bolt includes an other end having a cap portion extending beyond said hub.

* * * * *